United States Patent Office 2,719,141
Patented Sept. 27, 1955

2,719,141

HYDANTOIN ESTERS OF MALEIC ANHYDRIDE COPOLYMERS

Albert C. Smith, Jr., Rochester, N. Y., assignor to Eastman Kodak Company, Rochester, N. Y., a corporation of New Jersey No Drawing. Application July 7, 1954, Serial No. 441,934

12 Claims. (Cl. 260—77.5)

This invention relates to resinous polymers containing a hydantoin group, and more particularly to resinous ester polymers obtained by reaction maleic anhydride copolymers with 3-ω-hydroxyalkyl-5-benzal hydantoins.

The new class of resinous polymers of the invention contain in linear combinations the following recurring structural units:

(1)
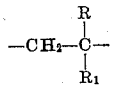

and (2)
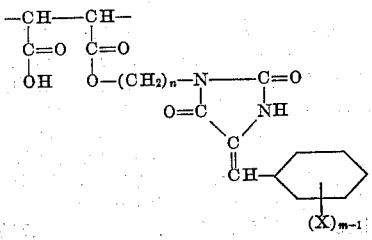

in the molar ratio of from 1:1 to 3:1 of (1) to (2) and wherein $n$ represents an integer of from 2 to 4 i. e. $(CH_2)_n$ represents ethylene, propylene or butylene groups, $m$ represents an integer of from 2 to 3, R represents an atom of hydrogen or a methyl group, $R_1$ represents an atom of hydrogen, a halogen atom such as chlorine or bromine, a phenyl group, a naphthyl group, a pyridyl group, a nitrile group, a carboxyl group, a carbamyl group, the groups $—O—COR_2$, $—CO—OR_2$, $—OR_2$, $—CONHR_2$, etc., wherein $R_2$ represents an alkyl group of from 1 to 4 carbon atoms, and X represents an atom of hydrogen, an atom of chlorine, an alkyl group of from 1 to 4 carbon atoms, e. g. methyl, ethyl, propyl, isopropyl, butyl, etc. groups, an alkoxy group containing from 1 to 4 carbon atoms, e. g. methoxy, ethoxy, propoxy, butoxy, etc. groups, acetamino group, a $—COOR_2$ group, a $—SO_3R_2$ group or an

group, wherein $R_2$ is as above defined.

Typical structural units represented by above (1) include the monoethylenically unsaturated polymerizable compounds containing the group $CH_2=C<$ such as ethylene, isobutylene, vinyl carboxylic esters such as vinyl acetate, vinyl butyrate, vinyl benzoate, vinyl halides such vinyl chloride, vinyl fluoride, vinylidene dichloride, etc., an alkyl ester, amide, N-alkyl substituted amide or nitrile of acrylic or methacrylic acids such as methyl acrylate, ethyl acrylate, methyl methacrylate, acrylamide, methacrylamide, N-methyl acrylamide, N,N-dimethyl acrylamide, N-methyl methacrylamide, acrylonitrile, methacrylonitrile, vinyl alkyl ethers such as vinyl methyl ether, vinyl ethyl ether, etc., styrenes such as styrene, alpha-methylstyrene, vinyl toluenes such as p-methylstyrene, p-acetaminostyrene, vinyl naphthalenes, C-vinyl pyridines, etc.

The above-defined resinous polymers of my invention are all soluble in one or more organic solvents such as dimethyl formamide, dioxane, methyl cellosolve acetate, pyridine, chlorinated hydrocarbons, etc., but become insoluble on exposure to light. Accordingly, they are useful for coating from their solutions onto various surfaces which can then be exposed to light to obtain insoluble and resistant coatings on such surfaces. Since the resinous materials of my invention are highly polymeric, such coatings are tough and continuous, and are especially useful for forming resist images on printing plate supports such as aluminum, zinc, copper and magnesium, and various alloys thereof. When coatings of the resinous polymers on such supports are light exposed to a subject such as a line, half-tone or continuous tone image, the coatings are rendered insoluble in organic solvents in the area of exposure, and the unexposed area can then be readily removed with one or more of the above-mentioned solvents. When sensitizing agents are incorporated into the solutions of polymer, the light sensitivity of the resulting coatings are increased and, accordingly, the exposure time of the process is decreased which is very advantageous. The resulting relief image of insolubilized polymer can then be used as a plate etching resist or if prepared on a lithographic surface of zinc, surface-hydrolyzed cellulose ester, casein, etc., the relief image can be inked and printed on a lithographic or other printing press. Those of my resinous polymers consisting of copolymers of styrene and maleic anhydride, in the ratio of from 1:1 to 3:1 molar proportions of styrene to maleic anhydride, which are subsequently esterified with certain 3-(ω-hydroxyalkyl)-5-benzal hydantoins, are especially light-sensitive and useful for preparing the above kind of resist images.

It is, accordingly, an object of my invention to provide a new class of resinous polymers. A further object is to provide compositions which are light-sensitive and particularly useful for photomechanical reproduction processes. Another object is to provide a process for preparing the new class of resinous copolymers. Other objects will become apparent hereinafter.

In accordance with my invention, I prepare the resinous polymers of the invention by first preparing the binary polymers of maleic anhydride by conventional polymerization methods, for example, by heating, exposing to actinic light such as ultraviolet, or use of polymerization catalysts such as benzoyl peroxide, potassium persulfate, etc., or combinations of these polymerization accelerators, in mass, in solution or suspensions in water or nonsolvents, a mixture of maleic anhydride and the selected comonomer. The copolymers are then reacted with the selected 3-(ω-hydroxyalkyl)-5-benzal hydantoins to obtain the corresponding light-sensitive resinous polymers of the invention. Preferably the above esterification reaction is carried out in a solvent medium such as pyridine at temperatures up to the refluxing temperature of the reaction mixture, preferably from about 30° to 120° C. The proportions of the 3-(ω-hydroxyalkyl)-5-benzal hydantoin employed can vary widely from an amount appreciably less than a molecular equivalent of the maleic anhydride in the copolymer to six or more times this amount, i. e. the components are present in the initial copolymers in the molar ratio of from about 0.5:1 to about 3:1 but preferably 1:1 of the comonomer to maleic anhydride. The intermediate hydantoin compounds employed in the esterification reaction may be prepared by reacting ethyl isocyanoacetate with an alkanolamine such as ethanolamine (2-aminoethyl alcohol), propanolamine (3-aminopropyl alcohol) or butanolamine (4-amino-n- butyl-alcohol) to obtain the corresponding N- -hydroxyalkyl-N'-carbethoxymethyl urea which may then be treated with an aqueous acid such as 6-normal hydrochloric acid to cause ring closure to give the corresponding 3-(ω-hydroxyalkyl) hydantoin. The latter compounds are then reacted with suitable aromatic aldehydes of the benzene series represented by the general formula

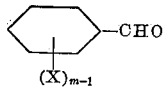

wherein m and X have the previously defined meanings, for example, benzaldehyde, monoalkyl substituted benzaldehydes such as o-tolualdehyde, m-tolualdehyde, p-tolualdehyde and corresponding ethyl-, propyl- and butyl-benzaldehydes, dialkyl substituted benzaldehydes such as 2,5-dimethyl-benzaldehyde, 3,5-dimethylbenzaldehyde, 2,6-dimethylbenzaldehyde, etc. and corresponding diethyl-, dipropyl- and dibutylbenzaldehydes, monoalkoxy substituted benzaldehydes such as m-methoxybenzaldehyde, o-methoxy-benzaldehyde, p-methoxy-benzaldehyde and corresponding ethoxy-, propoxy- and butoxy-benzaldehydes, dialkoxy substituted benzaldehydes such as 3,4-dimethoxy-benzaldehyde, 2,5-dimethoxy-benzaldehyde, etc. and corresponding diethoxy-, dipropoxy- and dibutoxy-, benzaldehydes, vanillin, isovanillin, piperonal, the carboxy-benzaldehydes such as o-aldehydo-benzoic acid, p-aldehydo-benzoic acid, etc. and sodium and potassium salts thereof, the sulfo-benzaldehydes such as benzaldehyde-m-sulphonic acid, benzaldehyde-o-sulphonic acid, etc. and sodium and potassium salts thereof, acetamino-benzaldehydes such as p-acetamino-benzaldehyde, etc., aminobenzaldehydes such as p-dimethyl- and p-diethyl-aminobenzaldehydes, chlorobenzaldehydes such as p-chlorobenzaldehyde, o-chlorobenzaldehyde, 3,5-dichlorobenzaldehyde, and the like to give the corresponding 3-(ω-hydroxyalkyl)-5-benzal hydantoins represented by the following general formula:

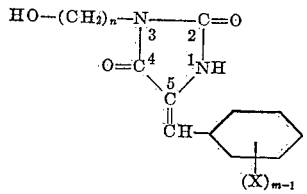

wherein n, m and X have the previously defined meanings.

The invention is illustrated further by the following examples.

*Example 1.—Preparation of N-β-hydroxyethyl-N'-carbethoxymethyl urea*

65 g. (0.5 mol.) of ethyl isocyanoacetate (O=C=N—CH₂—CO—OC₂H₅)

was added over a 10-minute interval to a well-stirred mixture of 35 g. (approx. 0.6 mol.) of ethanolamine in 500 cc. of dry benzene cooled externally by ice. Heat was generated during the addition. The mixture was allowed to sit without stirring for a few minutes after all reactants were added, and a good crop of crystals was formed. These were washed well with ether and air-dried. A yield of 90.7 g., M. P. 71°–73° C. equivalent to 95.5% of calculated theoretical was obtained of the product. Analysis of the product gave by weight 43.8% of carbon, 7.5% of hydrogen and 14.4% of nitrogen compared with calculated theory for these constituents of 44.2%, 7.4% and 14.5%, respectively, indicating thereby that a substantially pure N-β-hydroxyethyl-N'-carbethoxymethyl urea had been obtained.

In place of the ethanolamine, in the above example, there can be substituted an equivalent amount of propanolamine to give N-γ-hydroxypropyl-N'-carbethoxymethyl urea, or an equivalent amount of butanolamine to give N-ω-hydroxybutyl-N'-carbethoxymethyl urea.

*Example 2.—Preparation of 3-(β-hydroxyethyl)-hydantoin*

A mixture of 20 g. of N-β-hydroxyethyl-N'-carbethoxymethyl urea prepared as described in Example 1 and 50 cc. of 6-normal hydrochloric acid was evaporated by heat to a thick syrup. The liquid was then cooled in ice giving nearly a solid mass of slightly off-white crystals. This product was isolated by filtration, recrystallized twice from absolute alcohol, washed with ether and air-dried at 40° C. A yield of 7.4 g., M. P. 98°–101° C. was obtained. Analysis of this product gave by weight 42.0% of carbon, 5.7% of hydrogen and 19.5% of nitrogen compared with calculated theory for these constituents in 3-(β-hydroxyethyl) hydantoin of 41.6%, 5.5% and 19.4%, indicating thereby that the product was essentially pure 3-(β-hydroxyethyl) hydantoin.

By substituting for the N-β-hydroxyethyl-N-carbethoxymethyl urea in the above example, an equivalent amount of N-γ-hydroxypropyl-N'-carbethoxymethyl urea or an equivalent amount of N-ω-hydroxybutyl-N'-carbethoxymethyl urea, there is obtained the corresponding 3-(γ-hydroxypropyl) hydantoin and 3-(ω-hydroxybutyl) hydantoin.

*Example 3.—Preparation of 3-(β-hydroxyethyl)-5-anisal hydantoin*

22 g. (0.15 mol.) of 3-(β-hydroxyethyl hydantoin prepared as described in Example 2, 21 g. (0.15 mol.) of anisaldehyde, 35 cc. of dry pyridine and 15 cc. of diethylamine were refluxed together for 7.5 hours, then allowed to stand at room temperature for approximately 65 hours. The heavy orange colored precipitate which formed was recrystallized twice from ethanol and dried in air at 40° C. The resulting yellow product had a melting point of 206°–207° C. and by analysis contained by weight 59.8% of carbon, 5.2% of hydrogen and 10.5% of nitrogen compared with calculated theory for these constituents of 59.5%, 5.3% and 10.7% respectively, indicating that the product obtained was essentially 3-(β-hydroxyethyl)-5-anisal hydantoin having the structural formula:

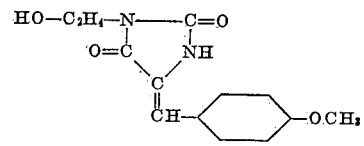

In place of the 3-(β-hydroxyethyl) hydantoin in the above example, there can be substituted an equivalent amount of 3-(γ-hydroxypropyl) hydantoin to give 3-(γ-hydroxypropyl)-5-anisal hydantoin or an equivalent amount of 3-(ω-hydroxybutyl) hydantoin to give 3-(ω-hydroxybutyl)-5-anisal hydantoin. Other of the mentioned aldehydes such as benzaldehyde and substituted benzaldehydes can also be used in the above example to replace the anisaldehyde to give corresponding 3-(hydroxyalkyl)-5-benzal hydantoins.

*Example 4.—Preparation of resinous reaction product of styrene-maleic anhydride copolymer and 3-(β-hydroxethyl)-5-anisal hydantoin*

101 g. (0.05 mol.) of dried styrene-maleic anhydride copolymeric resin containing equimolar proportions (1:1 coplymer) of styrene and maleic anhydride was dissolved in 100 cc. of boiling, dry pyridine. To this was added a slurry of 15 g. (approx. 0.06 mol.) of 3-(β-hydroxyethyl)-5-anisal hydantoin, prepared as described in Example 3, in 50 cc. of dry pyridine. An additional 15 cc. of pyridine was used as a wash. Solution occurred immediately.

The above solution was refluxed for 2 hours, and then poured into 2.5 liters of distilled water containing 500 cc. of acetic acid. Excellent, slightly tan fibers were obtained. These were washed in 3 liters of distilled water containing 250 cc. of acetic acid, and then in three successive distilled water washes. The resulting material was air dried at 45° C. A yield of 11.0 g. of product was obtained which on analysis gave values for carbon, hydrogen, nitrogen, methoxyl and carboxyl which indicated that the polymeric product contained approximately 0.43 mol. substitution of the hydantoin compound per mol. of styrene-maleic anhydride employed. This result indicates that over 85% of the maleic anhydride groups in the copolymer had reacted with the 3-(β-hydroxyethyl)-5-anisal hydantoin to give a resinous light-sensitive polymer comprising essentially the recurring structural unit:

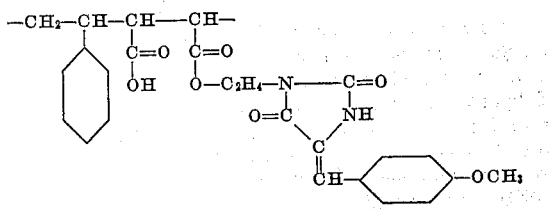

The product obtained in above Example 4 was soluble in dioxane, dimethyl formamide and methyl Cellosolve acetate, but insoluble in methyl ethyl ketone. A 2% solution or dope of the product in dioxane was coated on a paper support, the coated paper then exposed to a carbon arc through a step density tablet under both glass and Plexiglas (a clear sheet of acrylic ester resin), and the exposed paper than developed in dioxane and the resulting resist image thus obtained was inked and printed on a printing surface in the usual manner. The unsensitized resinous polymer prepared and coated as above described had a speed factor of 90 through glass and was also light sensitive through the Plexiglas. The addition of sensitizers to the said resinous polymer such as 2-benzoylmethylene-1-methyl-β-naphthothiazoline appreciably increased the speed factors.

By substituting equivalent amounts of other of the mentioned 3-hydroxyalkyl-5-anisal hydantoins for the 3-(β-hydroxyethyl)-5-anisal hydantoin in the above Example 4, other generally similar light-sensitive resinous polymers can be prepared, for example, the reaction product of the styrene-maleic anhydride with 3-(γ-hydroxypropyl)-5-anisal hydantoin or the reaction product of the styrene-maleic anhydride with 3-(ω-hydroxybutyl)-5-anisal hydantoin.

Also, as previously mentioned, the styrene-maleic anhydride copolymer in above Example 4 can be substituted by any styrene-maleic anhydride copolymer wherein the molar ratio of styrene to maleic anhydride comes within the ratio of from 1:1 to 3:1. Since the number of light-sensitive hydantoin groups present in the resinous polymer product cannot exceed the total number of maleic anhydride groups, it will be understood that the light-sensitivity of products prepared with molar ratios less than 1:1 of maleic anhydride will decrease accordingly.

By proceeding as set forth in the above description and examples, other generally similar light-sensitive resinous polymeric products can be prepared. For example, any of the mentioned copolymers of maleic anhydride with ethylene, isobutylene, vinyl carboxylic esters, alkyl acrylates or alkyl methacrylates, etc. can be reacted with any of the mentioned reaction products of 3-(β-hydroxyethyl) hydantoin or 3-(γ-hydroxypropyl) hydantoin or 3-(ω-hydroxybutyl) hydantoin reaction products with benzaldehyde or various substituted benzaldehydes to give resinous polymers characterized by becoming insoluble on exposure to light and, therefore, suitable for preparing resist images for photo-mechanical reproduction processes.

What I claim is:
1. A resinous ester copolymer comprising the recurring structural units:

(1) 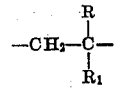

and (2) 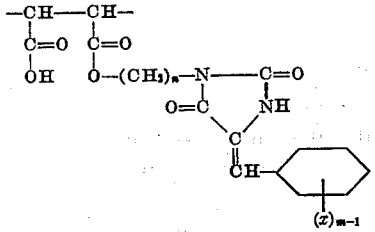

in the molar ratio of from 0.5:1 to 3:1 of units of (1) to units of (2), wherein $n$ represents an integer of from 2 to 4, $m$ represents an integer of from 2 to 3, R represents a member selected from the group consisting of an atom of hydrogen and a methyl group, $R_1$ represents a member selected from the group consisting of an atom of hydrogen, a halogen atom, a phenyl group, a naphthyl group, a pyridyl group, a cyano group, a carbamyl group, a carboxyl group, an —O—COR$_2$ group, a —CO—OR$_2$ group, an —OR$_2$ group, a —CO—NHR$_2$ group, and a —CO—NR$_2$R$_2$ group wherein R$_2$ represents an alkyl group of from 1 to 4 carbon atoms, and wherein $x$ represents a member selected from the group consisting of an atom of hydrogen, an atom of chlorine, an alkyl group of from 1 to 4 carbon atoms, an alkoxy group containing from 1 to 4 carbon atoms, an acetamino group, a carboxyl group, a sulphonic acid group, a —CO—OR$_2$ group, a —SO$_3$R$_2$ group and a —NR$_2$R$_2$ group wherein R$_2$ is as above defined.

2. A resinous ester copolymer comprising the recurring structural units:

(1) 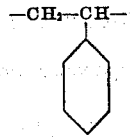

and (2) 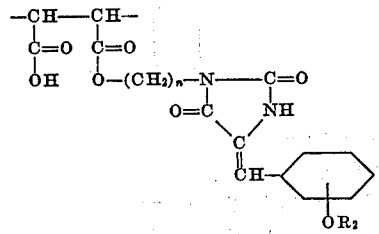

in the molar ratio of from 0.5:1 to 3:1 of units of (1) to units of (2), wherein $n$ represents an integer of from 2 to 4, and R$_2$ represents an alkyl group containing from 1 to 4 carbon atoms.

3. A resinous ester copolymer comprising the recurring structural units:

(1) 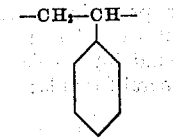

and (2) 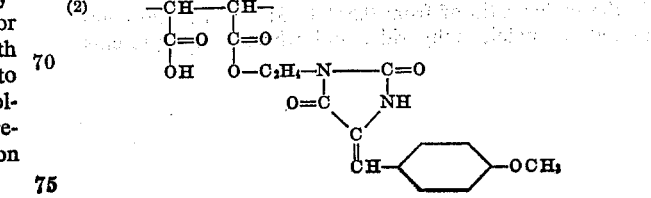

in the molar ratio of from 0.5:1 to 3:1 of units of (1) to units of (2).

4. A resinous ester copolymer comprising the recurring structural units:

(1) $-CH_2-CH-$ phenyl and (2) $-CH-CH-$ with $C=O$, $C=O$; $OH$, $O-C_3H_7-N----C=O$, $O=C$, $NH$, $C$, $CH-$ phenyl$-OCH_3$ in the molar ratio of from 0.5:1 to 3:1 of units of (1) to units of (2).

5. A resinous ester copolymer comprising the recurring structural units:

(1) $-CH_2-CH-$ phenyl and (2) $-CH-CH-$ with $C=O$, $C=O$; $OH$, $O-C_4H_9-N----C=O$, $O=C$, $NH$, $C$, $CH-$ phenyl$-OCH_3$ in the molar ratio of from 0.5:1 to 3:1 of units of (1) to units of (2).

6. A resinous ester copolymer comprising the recurring structural units:

(1) $-CH_2-CH-$ phenyl and (2) $-CH-CH-$ with $C=O$, $C=O$; $OH$, $O-C_2H_4-N----C=O$, $O=C$, $NH$, $C$, $CH-$ phenyl$-OCH_3$ in the molar ratio of approximately 1:1 of units of (1) to units of (2).

7. A process for preparing a resinous ester which comprises heating at from 30° to 120° C. a resinous binary copolymer containing maleic anhydride and a compound having the general formula:

$$CH_2=C-R \atop R_1$$

in the molar ratio of from 0.5:1 to 3:1 of the said compound to maleic anhydride, and wherein R represents a member selected from the group consisting of an atom of hydrogen and a methyl group, and $R_1$ represents a member selected from the group consisting of an atom of hydrogen, a halogen atom, a phenyl group, a naphthyl group, a pyridyl group, a cyano group, a carbamyl group, a carboxyl group, a $-O-COR_2$ group, a $-OR_2$ group, a $-CO-NHR_2$ group and a $-CO-NR_2R_2$ group wherein $R_2$ represents an alkyl group of from 1 to 4 carbon atoms, with a hydantoin compound having the general formula:

$$HO-(CH_2)_n-N----C=O \atop O=C \quad NH \atop C \atop \parallel \atop CH-\text{phenyl}(X)_{m-1}$$

wherein $n$ represents an integer of from 2 to 4, $m$ represents an integer of from 2 to 3 and X represents a member selected from the group consisting of an atom of hydrogen, an atom of chlorine, an alkyl group of from 1 to 4 carbon atoms, an alkoxy group containing from 1 to 4 carbon atoms, an acetamino group, a carboxyl group, a sulphonic acid group, a $-CO-OR_2$ group, an $-SO_3R_2$ group and an $-NR_2R_2$ group wherein $R_2$ is as above defined.

8. A process for preparing a resinous ester copolymer which comprises heating at from 30° to 120° C. a resinous binary copolymer containing maleic anhydride and styrene in the molar ratio of from 0.5:1 to 3:1 of styrene to maleic anhydride with a hydantoin compound having the general formula:

$$HO-(CH_2)_n-N----C=O \atop O=C \quad NH \atop C \atop \parallel \atop CH-\text{phenyl}-OR_2$$

wherein $n$ represents an integer of from 2 to 4, and $R_2$ represents an alkyl group of from 1 to 4 carbon atoms.

9. A process for preparing a resinous ester copolymer which comprises heating at from 30° to 120° C. a resinous binary copolymer containing maleic anhydride and styrene in the molar ratio of from 0.5:1 to 3:1 of styrene to maleic anhydride with 3-(β-hydroxyethyl)-5-anisal hydantoin.

10. A process for preparing a resinous ester copolymer which comprises heating at from 30° to 120° C. a resinous binary copolymer containing maleic anhydride and styrene in the molar ratio of from 0.5:1 to 3:1 of styrene to maleic anhydride with 3-(γ-hydroxypropyl)-5-anisal hydantoin.

11. A process for preparing a resinous ester copolymer which comprises heating at from 30° to 120° C. a resinous binary copolymer containing maleic anhydride and styrene in the molar ratio of from 0.5:1 to 3:1 of styrene to maleic anhydride with 3-(ω-hydroxybutyl)-5-anisal hydantoin.

12. A process for preparing a resinous ester copolymer which comprises heating at from 30° to 120° C. a resinous binary copolymer containing maleic anhydride and styrene in the molar ratio of approximately 1:1 of styrene to maleic anhydride wth 3-(β-hydroxyethyl)-5-anisal hydantoin.

References Cited in the file of this patent

UNITED STATES PATENTS 2,527,821    Johnson _____ Oct. 30, 1950